United States Patent [19]

Lemak

[11] 4,296,465
[45] Oct. 20, 1981

[54] DATA MOVER

[75] Inventor: Nicholas S. Lemak, Phoenix, Ariz.

[73] Assignee: Honeywell Information Systems Inc., Phoenix, Ariz.

[21] Appl. No.: 848,172

[22] Filed: Nov. 3, 1977

[51] Int. Cl.³ .............................................. G06F 1/00
[52] U.S. Cl. .................................................... 364/200
[58] Field of Search ... 364/200 MS File, 900 MS File

[56] References Cited

U.S. PATENT DOCUMENTS

| B 482,907 | 1/1976 | Nyssens et al. | 364/900 |
| 3,976,980 | 8/1976 | Hertz | 364/200 |
| 4,075,694 | 2/1978 | Ericsson | 364/200 |

Primary Examiner—Raulfe B. Zache
Attorney, Agent, or Firm—Edward W. Hughes; Wm. W. Holloway, Jr.; Ronald T. Reiling

[57] ABSTRACT

A data mover for moving blocks of data stored in a first location of the working store of a data processing system to a second location in the working store. The data mover is provided with the necessary registers, switches, counters and control circuits to issue read and write commands to the working store, to receive and store in registers data read out of the working store as the result of its having issued a read command, and to write data read out of working store and stored in its registers in response to a read command issued by the data mover into another location in the working store. These steps are repeated until a block, measured in thousands, of data words has been moved from the first to the second location. The address preparation circuits of the high speed multiplexer of the data processing system through which the data mover communicates with the working store of the system is used to provide a substitute memory command for one of the two types of memory commands issued by the data mover. Between the time the data mover issues a read command, and receives back from memory the data read out of memory in response to such a command, the data mover can issue a write command and transfer to the high speed multiplexer data received in response to the previous read command.

18 Claims, 5 Drawing Figures

FIG-1

DATA MOVER

CROSS REFERENCE TO RELATED APPLICATIONS AND PATENTS

The following copending applications or patents are related to the present application and are incorporated hereby by reference:

1. "Programmable Interface Apparatus and Method" invented by Garvin Wesley Patterson, William A. Shelly, Jaime Calle and Ernest M. Monahan, bearing U.S. Pat. No. 4,006,466 issued Feb. 1, 1977, and assigned to the same assignee named herein.

2. "A Pathfinder Microprogram Control System" invented by Garvin Wesley Patterson and Marion G. Porter, bearing U.S. Pat. No. 4,011,788, issued Jan. 4, 1977, and assigned to the same assignee named herein.

3. "Steering Code Generating Apparatus For Use In An Input/Output Processing System" invented by Garvin Wesley Patterson, William A. Shelly and Ernest M. Monahan, bearing U.S. Pat. No. 4,000,487, issued Dec. 28, 1976, and assigned to the same assignee as named herein.

4. "Priority Interrupt Mechanism" invented by Ernest M. Monahan, Garvin Wesley Patterson, and Jaime Calle, bearing U.S. Pat. No. 4,001,783, issued Jan. 4, 1977, and assigned to the same assignee as named herein.

5. "Dispatcher Mechanism" invented by Marion G. Porter, Jaime Calle, and Garvin Wesley Patterson, bearing U.S. Pat. No. 4,006,466, issued June 7, 1977, and assigned to the same assignee as named herein.

6. "Fail Soft Memory" invented by Marion G. Porter, Jaime Calle, and Garvin Wesley Patterson, bearing U.S. Pat. No. 4,010,450 issued Mar. 1, 1977, and assigned to the same assignee as named herein.

7. "Instruction Look Ahead Having Prefetch Concurrency and Pipeline Features" invented by Marion G. Porter, filed on Mar. 26, 1975, bearing Ser. No. 562,272 and assigned to the same assignee named herein.

8. "Data Alignment Circuit" invented by Darrell L. Fett, bearing U.S. Pat. No. 3,967,101 issued June 29, 1976, and assigned to the same assignee as named herein.

9. "Processor for Input/Output Processing System" invented by Marion G. Porter, Garvin Wesley Patterson, William A. Shelly and Nicholas S. Lemak, bearing U.S. Pat. No. 3,976,997 issued Aug. 24, 1976, and assigned to the same assignee as named herein.

10. "Method of Generating Addresses to a Paged Memory" invented by Garvin Wesley Patterson and Marion G. Porter, bearing U.S. Pat. No. 3,976,978 issued Aug. 24, 1976, and assigned to the same assignee as named herein.

11. "Memory Steering in a Data Processing System" invented by William A. Shelly bearing U.S. Pat. No. 3,990,051 issued Nov. 2, 1976, and assigned to the same assignee as named herein.

12. "Input/Output Multiplexer Security System" invented by Jaime Calle and Victor Michael Griswold bearing U.S. Pat. No. 4,017,839 issued Apr. 12, 1977, and assigned to the same assignee as named herein.

BACKGROUND OF THE INVENTION

1. Field of the Invention

This invention is in the field of electronic data processing systems, and more particularly in the field of apparatus which, with a minimum of intervention from the operating system of the data processing system transfers predetermined blocks of data from one location in the working store of the data processing system to a second location.

2. Description of the Prior Art

It has long been recognized that a significant gap exists in current storage hierarchies of computer systems between the access time of processor addressable memory which is measured in microseconds, for example, and mass storage access time, which is measured in milliseconds. Attempts to fill this gap with high speed rotating fixed head discs, or drums, has resulted in devices, the performance of which is only slightly better than that of movable head discs at costs which are considerably higher. Efforts to fill this gap with electronic devices, random access memories, such as core or solid state devices, produce access times similar to that obtained in main memory at equivalent costs, which makes such a solution uneconomical because of the large amount of storage required to significantly improve the throughput or performance of the computer system.

Large high speed data processors need either an extremely large processor addressable memory in order to reduce I/O activity to mass storage, or a fairly high speed random access electronic storage device of sufficient size to attract a large fraction of the I/O activity that would be directed to mass storage, primarily discs. Until recently the above identified solutions have been considered as the only alternatives for achieving desired system performance levels of large speed computers where I/O is the limiting factor. A recently developed third alternative is the use of electronic storage as a dynamic buffer, or I/O buffer, between mass storage devices and the working store of such a large high speed system.

A dynamic I/O buffer, or disc cache buffer, performs essentially the same function for disc storage devices as a cache located in the central processor does for main memory. At any given point in time, the disc cache will contain some portion of the currently active areas, or portions, of the data base. Like a cache of a processor, a disc cache buffer depends upon repetitive use of the data stored in the disc cache buffer to be effective.

In general, the mass sotrage address space would be divided into blocks of some fixed size. When an I/O operation is initiated to mass storage, a directory is first checked to see if the block being referenced, or addressed, is in the buffer; if it is not in the buffer, the reference block is brought into the disc cache buffer from mass storage replacing some other block if the buffer is full. The requested data is then delivered to the working store to complete the I/O operation.

To the applicant's knowledge, the implementation of an I/O buffer or disc cache buffer has been suggested and/or implemented as a software mechanism, or by appropriate programs, using standard software approaches to move the data from the I/O buffer to the working store or to permit a program to have access to the data in the I/O buffer. The problem with implementing such a requirement for moving data in memory from one location to another location, a memory to memory move, or transferring the access to a clock of I/O data from one program to another is the large amount of operating system overhead required by the data processing system which, of course, impacts the efficiency, or throughput, of the system. Permitting direct access to data stored in the disc cache buffer in effect permits the use of such data only once if integrity of the data is to be maintained.

As far as the Applicant is aware, no one has endeavored to provide a hardware solution for executing a memory to memory move, which hardware is separate and distinct from that of the central processor of the data processing system, and which hardware is transparent to such operating system, or to state it another way, requires no modification of the operating system to use the disc cache buffer as a source of I/O data. The data mover has an autonomous address generating capability so that it can issue memory commands to fetch data from one location in working store, or memory, and store such data in another area while minimizing interference with the operation of the data processing system of which it is a part. An input/output processing system in which the data mover of the present invention is adapted to be incorporated and the data processing system of which the I/O processing system is a portion is disclosed in U.S. Pat. No. 4,017,839, which issued Apr. 12, 1977, and which is assigned to the same assignee as this invention.

In summary, the problem with the prior art implementations, or suggested implementations, of an I/O buffer is that all the control and movement of data has heretofore been done by software using the facilities available to the computer system as an entity. Such a solution increases the overhead of the system, where overhead is defined as those opertions of the computer to control the computer rather than to performing useful work for the users of the system. Increasing the overhead has the disadvantage of reducing the throughput of the data processing system, other factors remaining the same, and thus reduces the performance gains that theoretically can be achieved by the use of an I/O buffer.

SUMMARY OF THE INVENTION

The present invention provides a hardware solution to the problem of implementing memory to memory moves of substantial blocks of data, measured in thousands of data words, from an I/O buffer, or disc cache buffer, to a location in the working store, or memory, specified by the operating system of the data processing system for subsequent use by a program in execution by the computer system. The hardware is essentially autonomous since it can receive and store instruction words and data words and is provided with the necessary registers, counters, switches, and digital logic circuits so that it can issue appropriate memory instructions to fetch data words from memory and store such words in registers of the data mover. It then can issue a write instruction and transmit the data words stored in its registers for storage in the user portion of main memory.

The data mover is provided with a throttle to minimize potential conflicts with other components of the data processing system for access to the memory and is designed so that its read and write instructions essentially overlap one another, which significantly increases the rate of transfer of data.

By being autonomous and having the ability to create addresses and necessary instructions, the data mover relieves the control processors of the data processing system of the responsibility for executing a memory to memory move of a block of data words from the I/O buffer to the working store where the data is accessible to application programs of the operating system. As a result, the rate at which large blocks of data can be moved from one location in memory to another is significantly increased.

It is, therefore, an object of this invention to provide a hardware means for implementing memory to memory moves.

It is still another object of this invention to provide a data mover for moving large blocks of data from one memory location to another memory location under the control of the operating system.

It is still another object of this invention to provide a data mover with a throttle so that the data mover will not request memory access at rates that cause the memory to substantially only service the data memory commands to the disadvantage of the overall performance of the data processing of which it is a part.

BRIEF DESCRIPTION OF THE DRAWINGS

Other objects, features, and advantages of the invention will be readily apparent from the following description of certain preferred embodiments thereof, taken in conjunction with the accompanying drawings, although variations and modifications may be affected without departing from the spirit and scope of the novel concepts of the disclosure, and in which.

DESCRIPTION OF THE PREFERRED EMBODIMENT

Figure 1:
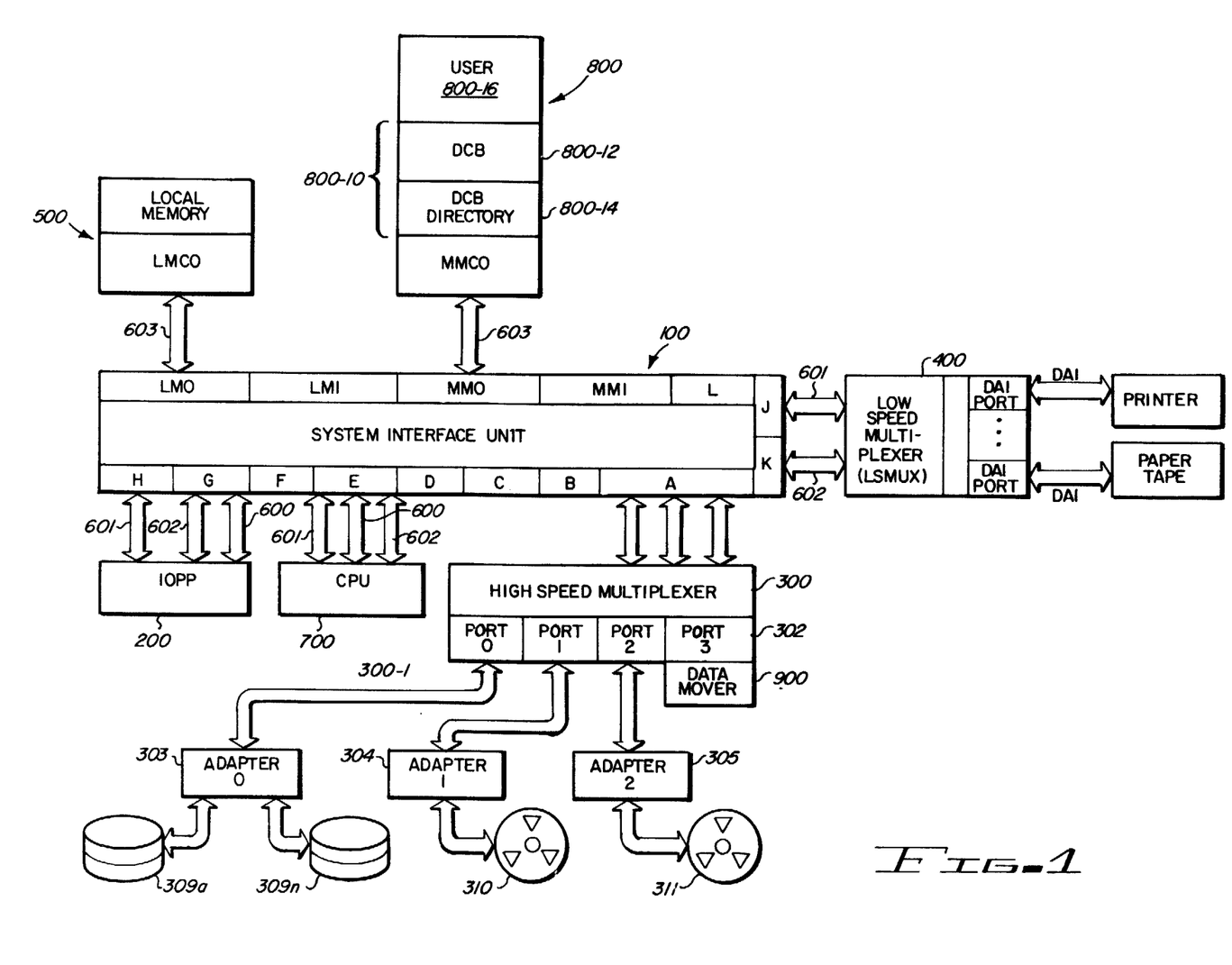
FIG. 1 is a block diagram of a data processing system with which the data mover of this invention can be used.

As illustrated in FIG. 1, the data processing system in which the present invention is incorporated includes at least one input/output processor (IOPP 200), a system interface unit (SIU 100), which has 15 ports identified by the letters A - K plus four memory ports, local memory port 0 (LM0), local memory port 1 (LM1), and two main memory ports (MM0, MM1). Local memory 500 and main memory 800 can be connected to either of these ports through memory controllers. Main memory 800 in some related applications and patents is also referred to as a remote memory. To simplify the description only one local memory 500 is illustrated which is connected to port LM0 through local memory controller LMC0 and one main memory 800 which is connected to port MM0 through main memory MMC0. On certain pairs of ports such as E, F, or G and H, I/O processor (IOPP) 200 can be connected. In FIG. 1 IOPP 200 is illustrated as being connected to ports G and H. Up to two central processing units (CPUs) 700 can be connected to any two of ports D, E, or F of SIU 100. However, to simplify the description, only one CPU is illustrated as being connected to port E. The devices or modules 200-800 are connected to their respective ports of SIU 100 through a plurality of lines of different types of interfaces 600 through 603.

A high speed multiplexer (HSMX) 300 can be connected to any one or all of ports A-F of SIU 100 and likewise a CPU 700 could be connected to any one or all ports D-F. A second IOPP 200 could be connected to ports E and F if desired. The number of HSMXs 300, CPUs 700 and IOPPs 200 connected to ports A-F depends upon the desired performance of the data processing system.

High speed multiplexer 300 is provided with four channels, or ports: Port 0, Port 1, Port 2, and Port 3. Each of the channels of multiplexer 300 can be connected to a disc; a tape; a communications controller, or adapter, which is not illustrated; or to data mover 900. In FIG. 1 Port 0 is illustrated as being connected to a disc controller 303, and ports 1 and 2 to tape controllers 304, 305. Data mover 900 is illustrated as being connected to Port 3 in FIG. 1. A low speed multiplexer LSMX 400 may be connected to ports J or K of SIU 100 and is designed so that printers, card readers, card punches, and the control console of the data processor can be directly connected to LSMX 400; or, to state it another way, LSMX 400 can directly control such devices. Port L is adapted to be connected to a configuration panel for the system.

Channel Port 0 of HSMX 300 is illustrated as being connected to a disc controller or adapter 303 of conventional design which controls the fetching of data from a plurality of discs 309 a-n and the writing of data onto discs 309 a-n as is well known in the art.

Figure 2A:
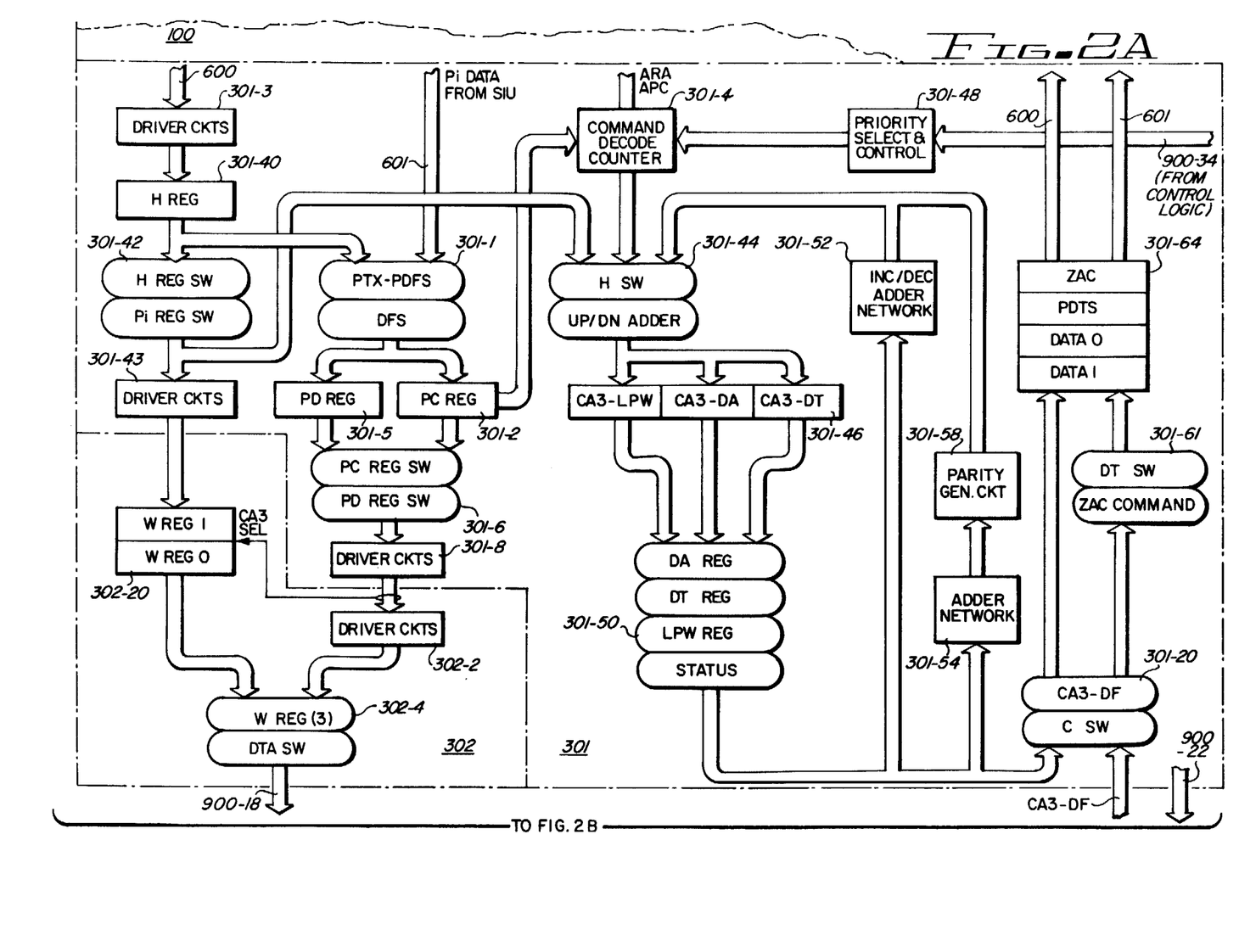
FIGS. 2A and 2B are schematic diagrams of the data mover and those elements of a high speed multiplexer of a data processing system necessary to move data under the control of the data mover from a disc cache buffer to a location in working store accessible to application programs and operating systems of the data processing system.

Since the disclosure of U.S. Pat. No. 4,017,839 which issued on April 12, 1977, and which is assigned to Honeywell Information Systems, Inc., the assignee of this invention and is incorporated by reference into this application; and since it discloses in detail the computer system which the data mover 900 of the present invention in its preferred embodiment is intended to be used, only those parts of HSMX 300 needed to explain the operation of data mover 900 are illustrated in FIG. 2. The portions of HSMX 300 illustrated are from the common control or logic section 301 of U.S. Pat. No. 4,017,839 plus that portion of a channel adapter port 302 illustrated in FIG. 4b of U.S. Pat. No. 4,017,839 to which data mover 900 is directly connected. The reference numerals on FIG. 2 correspond to those of U.S. Pat. No. 4,107,839 with the exception of those relating to the data mover 900.

Referring to FIG. 1, the flow of data, data words, instructions, or operands or both, is essentially from memory 800 to data mover 900 and then back to memory 800, the paths of the data essentially being a loop. Data words flow from data mover 900 into high speed multiplexer 300, and from HSMX 300 through SIU 100 to main memory controller (MMC0), for example. Main memory controller (MMC0) causes main memory 800 to respond to the instruction which is either to read data from or to write data into a given location or locations in memory 800. In response to a read instruction, data words, operands, or instructions, are transmitted from memory 800 to main memory controller MMC0. These data words, normally two in a preferred example, are then routed through SIU 100 to HSMX 300 and through high speed multiplexer 300 to data mover 900.

Before proceeding further with the detailed description of data mover 900, it is believed that it would be helpful to describe the general function of the system illustrated in FIG. 1 in which disc cache buffer (DCB) 800-10 is incorporated. A portion of main memory 800 is set aside, or dedicated, to being an I/O cache, or DCB, 800-10. Blocks of data words from discs 309 a-n are stored in the buffer portion 800-12 of DCB 800-10 and the disc addresses of these blocks are stored in directory 800-14 of DCB 800-10. To initiate a disc I/O the operating system of the data processing system will issue a "connect" instruction to IOPP 200 which processes the instruction and determines whether the input/output activity is a request for data stored on a disc such as disc 309a, for example, or to write data onto that disc. If the instruction is a read request, IOPP 200 determines whether the data requested is suitable for storage in DCB 800-10. If it is, the peripheral supervisor of the operating system of the IOPP 200 determines whether or not the addressed data is stored in DCB buffer 800-12 by checking DCB directory 800-14. In a preferred embodiment only data read from discs is written into DCB 800-10. All I/O writes to a disc are written onto the disc and are not written into DCB 800-10 even if the addressed block is stored in buffer 800-12.

When the peripheral supervisor determines that the data being sought meets the criteria for being stored in buffer 800-12 a disc cache buffer operating system is called, IOPP 200 checks to determine if the disc cache buffer 800-10 is operational. If it is, the DCB operating system will cause a search of directory 800-14 to be conducted. It should be noted that directory 800-14 contains the identity, the disc address in a preferred embodiment, of the blocks of data stored in buffer 800-12 of DCB 800-10. After the directory search, if the data requested is stored in buffer 800-12, a decision is made whether or not a disc cache buffer data move is to occur, and if so, if the criteria for such a movement is satisfied. If it is, then IOPP 200 branches to a disc cache buffer data mover software program which is a part, or a module, of the peripheral supervisor.

The data mover software controls the movement of data out of buffer area 800-12 to that part 800-16 of memory 800 which is available to application and operating system programs. The user portion 800-16 of main memory 800 is divided from, or logically separated from, disc cache buffer 800-10 so that the operating system and user programs of the system do not have access to DCB 800-10.

In response to the receipt by IOPP 200 of a connect instruction, IOPP 200 will check disc cache buffer directory 800-14 and if the block of information is not in directory 800-14 IOPP 200 will set up the controls to transfer one block of data from disc 309a, for example, to disc cache buffer 800-10 for storage in buffer portion 800-12. High speed mutiplexer 300 controls the transfer, in the sense that it provides the memory commands that store each data word in the block in the buffer 800-12 of disc cache buffer 800-10. When a block of data words is stored in buffer 800-12, directory 800-14 is updated and the seek address of the transferred block and the beginning address of the block in buffer 800-12 is stored in directory 800-14.

Since CPU 700 can only access data which is in the user portion 800-16 of main memory 800, it is necessary for a memory to memory move to be executed by data mover 900 to move data from buffer 800-12 to user portion 800-16 so that CPU 700 can access such data. An alternative arrangement is to have disc cache buffer 800-10 physically separate from working store 800 as a separate subsystem which could be connected to high speed multiplexer 300 through another channel or port, such as port 2.

The size and location of disc cache buffer 800-12 in memory 800 is defined at the time data processing system is initialized as is the size of the blocks of data words. In a preferred embodiment each data word has 36 bits plus four parity bits. Once these decisions are made, the size of the blocks of data words remain unchanged. In a preferred embodiment there can be up to 1024 blocks of data words. The maximum size of buffer 800-12 in a preferred embodiment is arbitrarily chosen as 2048K words which limits the maximum size of a block to 2K words, where $K=2^{10}$, or 1024, if the maximum number of blocks is to be stored in buffer 800-12.

When a comparison is found between the disc address of a disc I/O command and the disc address of a block of data in buffer 800-12 by a search of cache buffer directory 800-14, the comparison indicates that a block of data of predetermined size having that particular address on a disc is stored in the buffer. It is then necessary to move the required data, a part, or all of the block stored in buffer 800-12, to the user portion 800-16 of main memory 800 so that CPU 700 will have access to it.

Figures 2B, 3A:
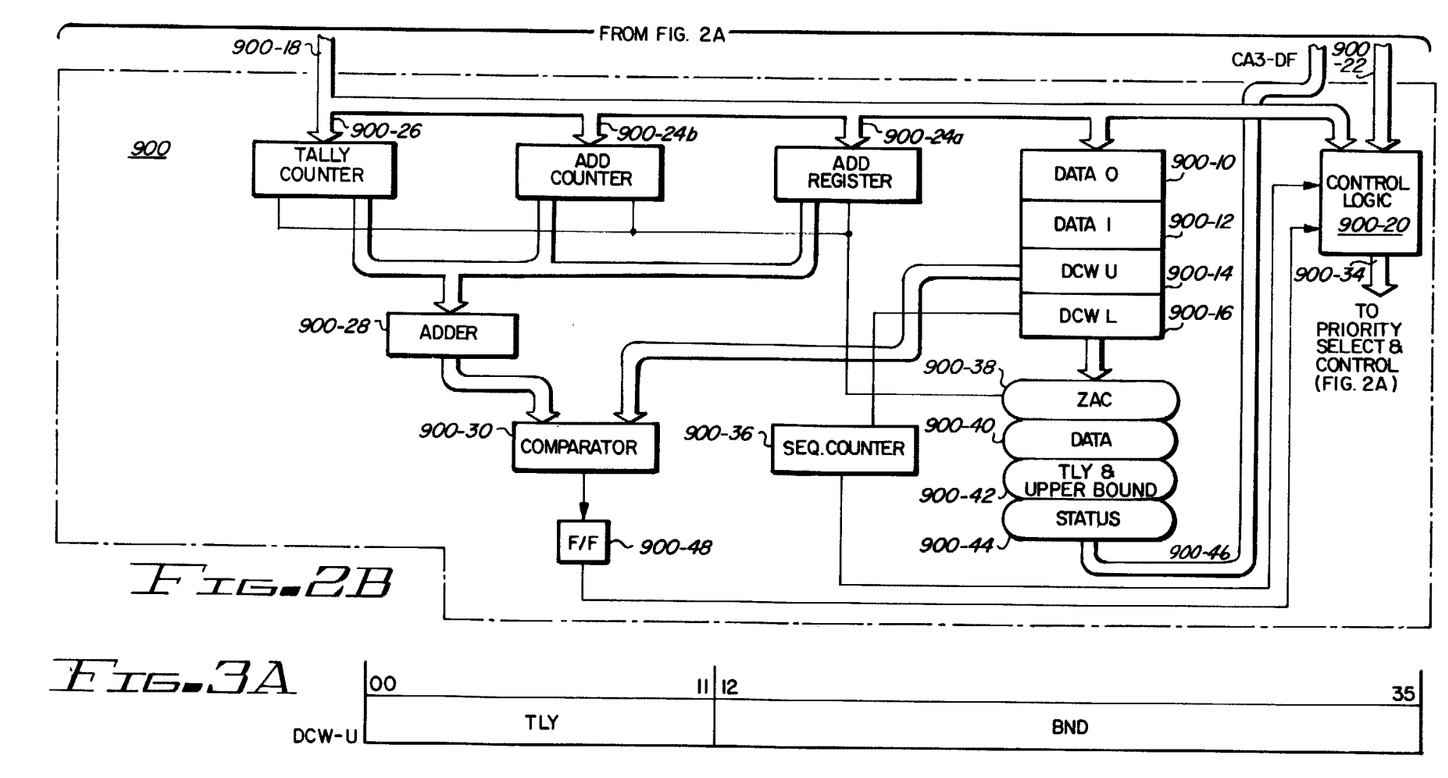
FIGS. 3A and 3B is the format of certain data words used in the operation of the invention.

Referring to FIG. 2B, data mover 900 has a bank of four registers 900-10, 12, 14, 16 each of which is adapted to store a 36 bit data word plus parity bits. Data mover 900 is connected to one of the ports, or channels, such as port 3 of high speed multiplexer 300. Under software control of IOPP 200 up to two data words are read from buffer 800-12 into registers 900-10, 900-12 of data mover 900 and then the data words in registers 900-10, 12 are written into, or stored in user portion 800-16 of main memory 800. Each of registers 900-14, 16 is used to store one-half of a data control word (DCW) of 72 bits plus parity. The DCW is received by data mover 900 and stored in registers 900-14, 16 by program instructions (PI) commands from IOPP 200. In addition, two data word registers, also referred to as W registers 302-20 of high speed multiplexer 300 assigned to channel adapter 3, or port 3, are used in executing a memory to memory move. As mentioned earlier, software alone could handle a memory to memory transfer but such a method is slow and overloads IOPP 200, hence the need for high speed data mover 900.

Figure 3B:
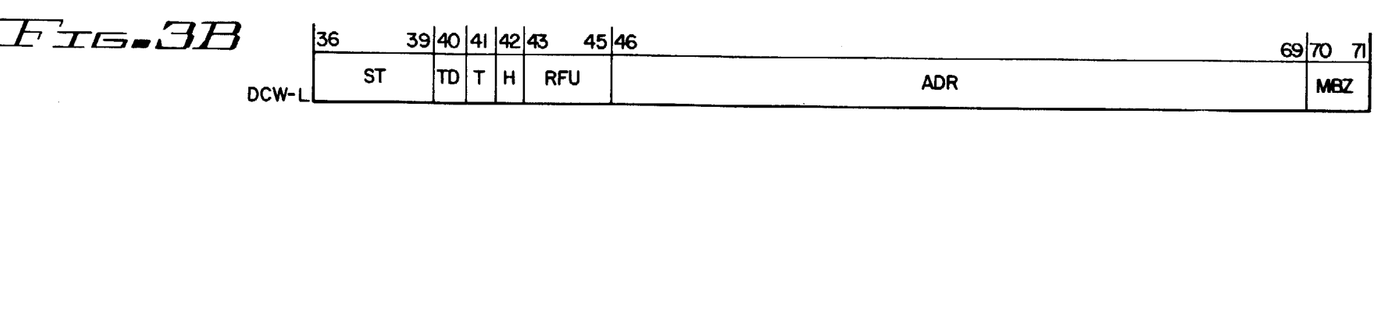

Data mover 900 uses a data control word (DCW) comprised of data words DCW-U and DCW-L. The DCW-L, the format of which is illustrated in FIG. 3B, includes the beginning address, bits 46-69 in buffer 800-12 of DCB 800-10 of the block of data to be moved. The tally portion bits 06-11 of DCW-U illustrated in FIG. 3A specifies the number of words to be transferred. The address of the last word in the block, the upper bound bits 12-35 is also found in the DCW-U.

The first step in moving data between a disc cache buffer 800-10 and the user portion 800-16 of main memory 800 is for IOPP 200 to load a list pointer word (LPW) into LPW register 301-46 of the high speed HSMX 300. The format of a LPW is illustrated in FIG. 8A of U.S. Pat. No. 4,017,839. This word contains the address bits 10-35 in local memory 500 at which two data words DA and DT have been stored. After IOPP 200 has loaded a DCW-U and DCW-L into registers 900-14, 16; a LPW into the LPW register of register bank 301-46; and set the control blocks 301-4 and 301-48 of HSMX 300 and the control block 900-20 of data mover 900, it issues a signal entitled set auto, bit 35 of a Load Control PI command, see FIG. 7B of U.S. Pat. No. 4,107,839 for the format, that causes HSMX to read the DA and DT words stored in local memory and store them in the DA and DT register of register bank 301-46. The DA word contains the address of data to be read or stored in main memory 800 and the DT word contains tally and control information relating to the memory to memory move to be executed. When the HSMX has received and stored the DA and DT data words in the DA and DT register of register bank 301-46, HSMX 300 notifies data mover 900 to begin the memory to memory move. In response to the signal, data mover 900 will send a zone area address command, or ZAC, the format of which is illustrated in FIG. 7C of U.S. Pat. No. 4,107,534 containing an address in disc cache buffer 800-10. This command is forwarded in a preferred embodiment unmodified by HSMX 300 and SIU 100 to main memory control controller MMC0. Controller MMC0 causes memory 800 to read two words stored in the addressed memory locations. The data words from memory are then transmitted through main memory controller MMC0, SIU 100, to HSMX 300 and are stored in the W registers 302-20 of HSMX 300. They are then promptly transmitted to data mover 900 and stored in registers 900-10, 12. If no data word is stored in registers 900-10, 12, and no unanswered read command has been issued, data mover 900 will then issue another direct read command in a preferred embodiment which is forwarded without modification to main memory controller MMC0. If a data word or words are stored in registers 900-10 or 12, data mover 900 will, while waiting for memory 800 to obtain the data words at the addressed locations, issue an indirect write command to HSMX 300 and will then transmit the data words stored in registers 900-10, 12 to HSMX 300, but only if at least a single word is stored in one of the registers 900-10 or 12. HSMX 300 in response to an indirect write command will generate a write command using information from registers 301-46. ZAC commands prepared and issued by HSMX 300 are designated as indirect commands. The address of the indirect command in the preferred embodiment is in the user portion 800-16 into which the two data words are to be stored. HSMX 300 transmits the indirect ZAC command, a write command in the preferred embodiment, and the data words received from DM 900 through SIU 100 to main memory controller MMC0 which causes memory 800 to store them in the addressed locations.

In FIG. 2B data mover 900 is provided with a bank of four registers 900-10, 12, 14, and 16, each of which is adapted to store, in a preferred embodiment, a 36 bit word plus parity bits. Registers 900-10 and 900-12 store data words, data word 0 and data word 1 and are sometimes referred to as data 0 or data 1 registers. Registers 900-14 and 900-16 store data control words (DCW)s. One-half of a DCW, a DCW-U, is stored in register 900-14 and the other half, a DCW-L, is stored in register 900-16. The words to be stored in registers 900-10, 12, 14, and 16 are transmitted to data mover 900 over data in bus 900-18 and are stored in their proper registers in response to control signals from control block or control circuits 900-20 of data mover 900. Control signals are also applied to data mover 900 through control bus 900-22 of high speed multiplexer 300. In addition to the four registers 900-10, 12, 14, and 16, data mover 900 is provided with an address register 900-24 which, in the preferred embodiment, is comprised of two portions, 900-24a and 900-24b. The address in the preferred embodiment comprises 24 bits, eight of the higher order bits of which are stored in address register 900-24a since they do not change. In addition, tally register counter 900-26 is provided into which can be stored a tally of up to 12 bits. The tally, as is conventional, is used to control the number of data words transferred by data mover 900 in executing a given memory to memory move instruction. At the time a DCW-U is loaded into register 900-14, the tally bits will be loaded into the tally register counter 900-26 and at the time the DCW-L is loaded into DCW-L register 900-16 the address bits are loaded into registers 900-24a and register counter 900-24b. Limiting address register counter 900-24b to 16 bits prohibits the crossing of a 64K word boundary during the execution of a single move instruction. To verify the integrity or accuracy of addresses prepared by data mover 900, the tally stored in counter 900-26 and the address stored in address counter register 900-24b and address register 900-24a are added by a conventional adder circuit 900-28. Their sum is then compared with the upper bound obtained from the DCW-U stored in register 900-14 by comparator 900-30. If the current address plus tally does not equal the upper bound, or they do not compare, a signal is applied to comparison error flip-flop 900-48 to set it, which produces a comparison error signal. The comparison error signal is then applied to control block 900-20 which, in response to the receipt of such a signal, stops data mover 900 from continuing the execution of the memory to memory move instruction then in execution and energizes one of the fault signal lines of signal bus 900-34 which is connected to HSMX 300. Data mover 900 is also provided with a service sequence counter, or throttle 900-36, which is controlled by throttle bits, bits 41 and 42 of the DCW-L, stored in register 900-16 to throttle or slow down the rate of transfer of data by data mover 900. It does this by inhibiting control block 900-20 from issuing a request for service until after a given number of clock pulses have been applied to sequence counter 900-36 to return its count to zero, for example, Counter 900-36 is set by the throttle bits of the DCW-L so that it will wait for 4, 8, 12, or 16 clock pulses or periods before reaching zero, which enables data mover 900 to energize its service request control line from control block 900-20, one of the conductors of control bus 900-34.

A bank of four switches 900-38, 40, 42, 44 determines the data that will be applied to the output data bus 900-46 of data mover 900 which connects data mover 900 to high speed multiplexer 300. Switch 900-38, when enabled, will apply a memory or ZAC command to bus 900-46. The format of such a command is illustrated in FIG. 7C of U.S. Pat. No. 4,017,839. Switch 900-40 controls the flow of data words that are stored in registers data 0, 900-10 and data 1, 900-12.

Under certain circumstances the operating system of IOPP 200 will need information concerning the status of data mover 900, such as the contents of tally counter 900-26, the address stored in address registers 900-24a and 900-24b. When switch 900-42 is enabled by control circuit 900-20, status information will be applied to bus 900-46. It should be noted that control block 900-20 is connected to input bus 900-18 so that information, PI command and data, for example, transmitted over bus 900-18 can be applied to control block 900-20.

Only those portions of the high speed multiplexer 300 that are needed by data mover 900 to move data from one position in memory to another are also illustrated in FIG. 3. A complete description of HSMX 300 is found in U.S. Pat. No. 4,017,839. High speed multiplexer 300 has a bank of four registers 301-64 which includes a ZAC register, data register, data 0, and data 1, in which the data words, data 0 and data 1, are stored; and register PDTS into which PI commands and data can be stored. In addition to the bank of four registers 301-64, high speed multiplexer 22 is provided with a bank of three registers 301-46, LPW, DA, DT, whose function is described supra.

PI instructions are transmitted to high speed multiplexer 300 through SIU 100 on PI data bus 601, and are initially stored in PC register 301-2. Control of the various registers and switches of high speed multiplexer 300 is by control block 301-4 and 301-48 to which are applied control signals transmitted over data bus 900-34 of DM 900. Control signals for control block 301-4 will cause the correct register of bank of registers 301-64 to store commands and data words transmitted over bus 900-46 from DM 900 as is conventional and well known in the art. Data words stored in the registers of register bank 301-64 are transmitted to SIU 100 by switches and control signals as is described in U.S. Pat. No. 4,107,839. A bank of switches 301-50 is used to apply data words or bits, from registers 301-46 through the C. switch of the block of select switches 301-20 when an indirect ZAC command is issued by HSMX 300. Such an indirect ZAC command includes information obtained from the DA register of register bank 301-46. Adder network 301-54 is used to increment the address stored in the DA register of block 301-46 and decrement the tally which is stored in register DT of block 301-46 after each indirect ZAC command is issued by HSMX 300. In the preferred embodiment, the address generation capability of high speed multiplexer 300 is used to provide the address of the location in user memory 800-16 into which data is to be stored or written.

Referring to FIG. 1, main memory 800 and its main memory controller MMCO function and operate in the same manner as local memory 500 and local memory controller LMO which are described in detail in U.S. Pat. No. 4,107,839. The function and operation of SIU 100 in transmitting data words by HSMX 300 to maintain 800 or local memory 500 as well as the transmission of data words from either memory 800 or 500 is also set forth in U.S. Pat. No. 4,107,839 and therefore need not be described here.

DATA MOTOR CONTROL LOGIC EQUATIONS

Control logic block 900-20 receives various control signals from the high speed multiplexer on bus 900-22 and over bus 900-18. It supplies control signals to HSMX 300 over bus 900-34 which supplies signals to the priority select and control block 301-48 and to the command decode and control block 301-4. The following are the definitions of the control signals applied to data mover 900 from high speed HSMX 300.

| | Definition of DM Inputs from HSMX |
|---|---|
| SEL: | Indicates that the DM has been selected to receive a PI command, Status or Tally Indicator. |
| PI-SEL: | Indicates that a Select for a PI command is in progress. |
| SER-ANS: | Indicates that the request by the DM is being serviced. |
| LD-REG: | Indicates that the current contents of the PI Register in the HSMX common logic specify a |

-continued

| | Definition of DM Inputs from HSMX |
|---|---|
| PC-(01,28,32→35): | Load Register command. Indicate the value of the corresponding bits of the PI Register 301-2 in HSMX common logic. |
| LIST-SNGL: | Indicates that the result of a List Service on behalf of the DM specifies that a Single Precision service be executed for the next Indirect Data Service. |
| SNGL-TLY: | Indicates that the Indirect Data Service in progress has reduced the DCW Tally, DT register to one word. |
| W REG. O FUL: | Indicates that the Even Data Register in the HSMX common logic contains data. |
| W REG.1-FUL: | Indicates that the Odd Data Register in the HSMX common logic contains data. |
| CφM-FAULT: | Indicates that a fault has been detected in the HSMX common logic. |
| AST: | Indicates that a Select to accept Status is in progress. |
| BAD-AST: | Indicates that memory status has been recieved by the HSMX logic which specifies a fault condition. |
| DTS-PE: | Indicates that a Parity Error has been detected on data transmitted from the DM to the HSMX common logic. |
| RD-EDT: | Indicates that the End Data Transfer condition has been achieved for Indirect Read Peripheral (Write Memory) service. |
| W-EDT: | Indicates that the End Data Transfer condition has been achieved for Indirect Write Peripheral (Read Memory) services. |
| WD-(00→35): | The Thirty-six data bit interface from HSMX common logic. |
| WD-P (0→3): | The four Parity bits for the Thirty-six bit data interface. |
| CLφCK: | System clock pulse which runs continuously and is used as the timing to load all bistable elements. |
| INIT: | System Initialize used to start. |

The control logic 900-20 applies the following control signals to the high speed multiplexer over bus 900-34.

| | Definition of DM Outputs to HSMX |
|---|---|
| PI-REQ: | Request to transmit PI Data from the DM to the HSMX. |
| PI-ENAB: | Enables the transmission of PI command and Data from HSMX to the DM via the WD interface. |
| SER-REQ: | Requests the servicing of a List or Data service by the HSMX for the DM. |
| DIR: | A unique line which identifies the requested service as a Direct Data Service. |
| WRT: | A unique line which identifies the requested service as a Write to Memory. |
| DP: | A unique line which identifies the requested service as a Double Precision (2 words) service. |
| RD-W: | Defines which W Register contents are to be transmitted from HSMX to the DM via the 900-18 interface. |
| NEXT-DCW: | An interrupt which indicates that the current DCW resident in the DM for Direct Data services has been exhausted and it is not the last DCW. |
| QUIT: | An interrupt which indicates that either the Direct or Indirect or both DCW list has been exhausted which concludes the operation. |
| FAULT-INT: | An interrupt which indicates that a fault condition has been detected and the movement of data has ceased. |

The control logic block 900-20 is comprised of numerous control flip-flops. The following are a list of the flip-flops and the signals that set them and reset them.

Control Flip-Flops

ADD-MIS (Address Misalignment Fault)

SET = LD-ADD-CNTR·(WD-34+WD-35)
RESET = RST-FAULTS

CφMP-ERR (Compare Error Fault)
SET = CHK-CφMP·[Bφund (00→23)≠ADRS-(00→07),ADER-(08→23)]

RESET=RST-FAULTS
COM - FFLT-FF (Common Fault Flip-Flop)
 SET=CφM-FAULTS
 RESET=RST-FAULTS
φUTPUT-PE (Output Parity Error Fault)
 SET=SER-ANS·SW-SEL-0·DTS-PE
 RESET=RST-FAULTS
PI-ENAB (PI Data Enable)
 SET=SEL·PI-SEL·NφRM-SVCE·PI-ENAB
 RESET=LD-REG+PI-REQ
PI-RD (PI Read Register Control)
 SET=PI-ENAB·PC-01
 RESET=PI-ENAB+PC-01
PI-REQ (Request for PI Data Transmittal)
 SET=PI-REQ·(PI-RD+[PI-ENAB·LD-REG])
 RESET=SER-ANS+(PI-ENAB·LD-REG)
PI-DELAY (PI End of Service Delay)
 SET=PI-REQ·PI-ENAB
 RESET=PI-REQ+PI-ENAB
ID-ONLY (PI Read ID Only Command)
 SET=PI-ENAB·PC-01·PC-28·WD-31
 RESET=SER-ANS+(PI-ENAB·LD-REG)
REST (Restricted Register Access Fault Detect)
 SET=PI-ENAB·WD-02
 RESET=PI-ENAB+WD-02
WRITE-DCB (Direct Writes, Indirect Reads)
 SET=PI-ENAB·LD-REG·PC-01·PC-34
 RESET=PI-ENAB·LD-REG·PC-01·PC-33
1st LIST (First List Service)
 SET=PI-ENAB·LD-REG·PC-01·PC-35
 RESET=CLR-CHNL+AUTφ+SHT-CNT=1
AUTO (Auto Data Transfer)
 SET=PI-ENAB·LD-REG·PC-01·PC-35
 RESET=CLR-CHNL+QUIT+FAULT-INT
REST-ERR (Restricted Register Access Fault Flip-Flop
 SET=LD-REG·PI-REQ·REST
 RESET=RST-FAULTS
REG-LD-ERR (Register Load Error)
 SET=LD-REG·PI-REQ·PC-28
 RESET=RST-FAULTS
LD-REG-PNTR (Load Data Mover Data Register Pointer)
 SET=LD-REG-PNTR·(LD-DTA-0+AD-DTA-1)
 RESET=AUTφ+CLR-CHNL+LD-DTA-0+LD-DTA-1
RD-REG-PNTR (Read DM Data Register Pointer)
 SET=RD-REG-PNTR·CHNG-RD-PNTR
 RESET=AUTφ+CLR-CHNL+CHNG-RD-PNTR
DTA-0-FULL (Data Register 0 Contains Data)
 SET=DTA-0-FULL·EVN-FULL·LD-REG-PNTR·PI-SVCE
 RESET=AUTO+CLR-CHNL+(CHNG-RD-PNTR·RD-REG-PNTR)
DTA-1-FULL (Data Register 1 contains Data)
 SET=DTA-1-FULL·φDD-FULL·LD-REG-PNTR·PI SVCE
 RESET=AUTφ+CLR-CHNL+(CHNG-RD-PNTR·RD-REG-PNTR)
RD-CφV (Read Service is Outstanding)
 SET=RD-SVCE
 RESET=AUTφ+CLR-CHNL+LD-DTA-0+LD-DTA-1
RD-SVCE (Read Memory Data Service)
 SET=SVC-SET-φK·RD-SVCE-Gφ
 RESET=AUTφ+CLR-CHNL+SHT-CNT=1
WRT-SVCE (Write Memory Data Service)
 SET=SVC-SET-φK·WRT-SVCE-INC·RD-SVCE Gφ
 RESET=AUTφ+CLR-CHNL+SHT-CNT=1
RD-SNGL (Single Precision for Read Memory)
 SET=(WRITE-DCB·IND-SNGL)+(WRITE-DCB·DIR-SNGL)
 RESET=AUTO+CLR-CHNL+(RD-SVCE·CNT-2·CMT-3)
WRT-SNGL (Single Precision for Write Memory Service)
 SET=(WRITE-DCB·IND-SNGL)+(WRITE-DCB·DIR-SNGL)+(RD-END·SNGL-FUL-L·WRT-SVCE-IND)
 RESET=AUTφ+CLR-CHNL+(WRT-SVCE·CNT-2 CNT-3)
READ-DφNE (The DCW List for Memory Read has exhausted)
 SET=(WRITE-DCB·LD-DTA-REG·W-EDT)+(WRITE-DCB·LAST-DCW·TR-φ·AUTφ)
 RESET=CLR-CHNL+(PI-ENAB·LD-REG·PC-01·WD-25)
WRITE-DφNE (The DCW List for Memory Write has exhausted)
 SET=(WRITE-DCB·SER-ANS·RD-EDT)+(WRITE-DCB·LAST-DCW·TR-φ·AUTφ)
 RESET=CLR-CHNL+(PI-ENAB·LD-REG·PC-01·WD-25)
TALY-MT (The DCW has exhausted and the Tally word has not been reloaded)
 SET=UPDATE·TALY+1
 RESET=LD-TLY-CNTR
ADRS-MT (The DCW has exhausted and the address word has not been reloaded)
 SET=UPDATE·TALY+1
 RESET=LD-ADD-CNTR Set forth below are the definitions of the mnemonics not previously defined.

Control Points for Registers and Switches

NBL-LD-REG (Clock Enable for the 4 word Holding Register 900-10-16)
 PI-LD-REG+LD-DTA-0+LD-DTA-1
WR-ADD-0 (Holding Register Write Address Bit 0—Most Significant Bit)
 PI-LD-REG·PC-33
WR-ADD-1 (Holding Register Write Address Bit 1—Least Significant Bit)
 (PI-LD-REG·PC-34)+(PI-LD-REG·LD-REG-PNTR)
PI-RDRG-0 (Holding Register Read Address Bit 0—Most Significant Bit)
 PI-REQ·PC-01·PC-33
RDRG-1 (Holding Register Read Address Bit 1—Least Significant Bit)
 (PI-REQ·PC-01·PC-34)+[(PI-REQ+PC-01)·RD-REG-PNTR]
LD-ADD-CNTR (Load the DCW Address Counter)
 PI-LD-REG·PC-33·PC-34
LD-TLY-CNTR (Load the DCW Tally Counter)
 PI-LD-REG·PC-33·PC-34
UPDATE (Update Counters—Increment address and Decrement Tally)
 (DIR-SVCE·DP·REQ-ANS)+(DIR-SVCE·CNT-2·CNT-3)+(PI-ENAB·LD-REG·PC-01·WD-29)
REQ-ANS (Parallel Load Enable for the Service Sequence Counter)

NϕRM-SVCE·CϕUNT=0·SER-ANS
SW-SEL-0 (Switch Select Bit 0—Most Significant Bit)
 (PI-REQ·PC-01·PC-32·PC-33)+(PI-REQ·PC-01·ID-ϕNLY)
SW-SEL-1 (Switch Select Bit 1—Least Significant Bit)
 [PI-REQ·PC-01·(ID-ϕNLY+PC-35)]+[(PI-REQ·PC-01)·CϕUNT=0]

In addition to signals that are produced by the control flip-flop, control logic 900-20 also has gated output lines that form a part of block 900-20. The definitions of these lines and the conditions under which they are produced are set forth below.

Gated Output Lines 900-34

RD-W=(PI-RD·PC-32·PC-33·PC-34·PC-35)+LD-DTA-0+LD-DTA-1
DP (Double Precision)=(RD-SNGL·RD-SVCE)+(WRT-SVCE·WRT-SNGL)
DIR=(WRITE-DCB·WRT-SVCE)+(WRITE-DCB·RD-SVCE)
SER-REQ=CϕUNT=0·NϕRM-SVCE
QUIT=(WRITE-DϕNE·NϕRM-SVCE)+(RD-END·NϕRM-SVCE·SNGL-FULL)
NEXT-DCW=AUTϕ·TRϕ·LAST-DCW
FAULT-INT=ADD-MIS+CϕMP-ERR+ϕUT-PUT-PE+CϕM-FLT-FE+REST-ERR+REG-LD-ERR In the foregoing portions describing the control logic block 900-20 certain intermediate quantities are used. Those that have not been defined earlier are set forth and defined below.

Supporting Intermediate Quantities

RST-FAULTS (Reset Fault Flip-Flops)
 (PI-REQ·PC-01·PC-32·PC-33·PC-35)+CLR-CHNL
CHK-CϕMP (Check for a Compare condition)
 AUTϕ·CHK-SVCE·TRϕ
CLR-CHNL (PI Command to Clear the Channel)
 PI-ENAB·LD-REG·PC-01·WD-30
CHK-SVCE (Check for Service requirement)
 CϕMP-ERR·QUIT·NEXT-DCW·PI-SVCE·NϕRM-SVCE
TRϕ (Tally Run Out of current DCW)
 TALY-MT+ADRS-MT
NϕRM-SVCE (Normal Service in progress)
 RD-SVCE+WRT-SVCE+1ST-LIST
SHT-CNT=1 (The Counter's Two Least Significant Bits=1)
 CNT-2·CNT-3
LD-DTA-0 (Load Data Register 0)
 DTA-0-FULL·EVN-FULL·LD-REG-PNTR·PI-SVCE
LD-DTA-1 (Load Data Register 1)
 DTA-1-FULL·ϕDD-FULL·LD-REG-PNTR·PI-SVCE
CHNG-RD-PNTR (Change the Read Register Pointer)
 (WRT-SVCE·DP·CNT-2·CNT-3)+(WRT-SVCE·CNT-2·CNT-3)
SVC-SET-ϕK (OK to Set a Service Request)
 AUTϕ·CLR-CHNL·LD-DTA-0·LD-DTA-1·CHK-SVCE PI-DELAY·CϕUNT=0·(PI-SEL·SEL)
RD-SVCE-Gϕ (Data Conditions warrant a Read Service)
 RD-CϕV·READ-DϕNE·[(EVN-FULL·ϕDD-FULL)+(RD-SNGL·EVN-FULL)+(RD-SNGL·ϕDD-FULL)]
WRT-SVCE-IND (Data conditions warrant a Write Service)
 (DTA-0-FULL·DTA-1-FULL)+(WRT-SNGL·DTA-0-FULL)+(WRT-SNGL·DTA-1-FULL)+CHNG-RD-PNTR
IND-SNGL (The next Indirect Request in Single Precision)
 (SEL·LIST-SNGL)+(SER-ANS·SNGL-TLY)
DIR-SNGL (The next Direct Request is Single Precision)
 (COUNT=0·TRϕ·ADRS-23)+(CϕUNT=0·TALY=1)
RD-END (Reading of Data is completed)
 READ-DϕNE·RD-CϕV·LD-DTA-0·LD-DTA-1
SNGL-FULL (At least One Register contains data)
 DTA-0-FULL+DTA-1-FULL
LD-DTA-REG (Load a Data Register)
 LD-DTA-0+LD-DTA-1
PI-LD-REG (PI Command to Load a Register)
 (LD-REG·PI-REQ·PC-28·REST)+(PI-RD·PC-32·PC-33·PC-34·PC-35)
REQ-ANS (Request is being answered)
 NϕRM-SVCE·COUNT=0·SER-ANS The foregoing provides the list and the definitions of various control signals and when they are set or reset. Since it is within the skill of logic engineers to create the necessary gates and flip-flops to produce the signals having this information, the description of the details of control logic block 900-20 is not believed necessary and is therefore not provided.

Data mover 900 is used to move a block of data from buffer portion 800-12 of disc cache buffer 800-10 which is located in memory 800 to the user portion 800-16. If, while the data processing system is executing a given program, that program requires information stored on a disc such as disc 309a, for example, the operating system of CPU 700 will request an I/O operation to obtain the desired data stored at a given location on that disc. Such an I/O command is transmitted to IOPP 200. IOPP 200 will check to determine if the data requested is in disc cache buffer 800-10 by conducting a search of directory 800-14 of DCB 800-10. If the desired data is stored in buffer 800-12, IOPP 200 will issue a PI command to HSMX 300 which causes it to load a list pointer word (LPW) into LPW register of the bank of registers 301-46 of HSMX 300. The LPW includes the address in local memory 500 of two data words, DA and DT. IOPP 200's operating system also has a file in which is recorded the current status of data mover 900, if it is busy or not busy; and if it is not busy, IOPP 200 will load into the registers 900-14 and 900-16 of data mover 900 the DCW needed by data mover 900 to execute a memory to memory move. The memory address in the DCW supplied to data mover 900 is, in a preferred embodiment, located in buffer 800-12. IOPP 200 will also set the controls of data mover control block 900-20 by issuing a PI command which sets or resets certain of the flip-flops of control block 900-20 so that data mover 900 can execute a data move. In response to the set auto signal, high speed multiplexer 300 will request a memory service using the address stored in its LPW register of the bank of registers 301-46, the list pointer word, to fetch the DA and DT words, which words are read out of local memory 500. The two words are stored in the DA and DT registers of the bank of registers 301-46 of high speed multiplexer 300. Until the data words are stored in registers DA and DT, high speed multiplexer 300 will not accept any words from data bus 900-46 of data mover 900. Once the DA and DT registers of high speed multiplexer 300 have the DA and DT words stored in them, the high speed multiplexer 300 will respond to a service request signal from data mover 900. Control block 900-20 of data mover 900, if no data words are stored in either of its data registers 900-10, 900-12, will issue a ZAC memory read command by enabling ZAC switch 900-38 having an address of the memory location in buffer memory 800-12. At the same time, data mover 900 will provide control signals to HSMX 300 indicating that the first data word to be transmitted to HSMX 300 through output bus 900-46 will be a read or a write single or double direct or indirect ZAC command depending upon how control block 900-20 was initialized or set, at the time of initiating a memory to memory move by appropriate PI commands from IOPP 200. After the first read instruction has been issued in the execution of a memory to memory move, then subsequent ZAC read commands will normally be a read double command addressed to a location in buffer 800-12 of main memory 800; the address being that which is stored in address registers 900-24a and 900-24b. The ZAC command includes steering information which causes high speed multiplexer 300 and SIU 100 to apply the command to main memory controller MMC0 plus the necessary information to identify the command as being a read command and whether it is a read single or read double. Normally, in a memory to memory move all read and write commands, read or write two data words of 36 bits each plus parity except possibly the first and last such commands of a given memory to memory move. When a ZAC command is applied to output bus 900-46 by enabling switch 900-38, control circuit 900-20 requests service by high speed multiplexer 300 by a signal on the service request line. HSMX then causes the first data word on bus 900-46 to be stored in the ZAC register of register block 301-64 and the next two data words, which will be transmitted on bus 64, one during each subsequent clock period, to be stored in the data 0 and the data 1 registers of register block 301-64. Three data words are transmitted even though no actual data words, all bits are zeros for example, are stored in registers 900-10 and 900-12 which would be the situation on the first read cycle of a given memory to memory move. High speed multiplexer 300, in response to control signals applied to it over control bus 900-34, knows that the ZAC command placed in its ZAC register of the block of registers 301-64 is a direct read request, for example. HSMX 300 will then request SIU 100 for service by applying a service request signal to SIU 100 and will connect the signals from ZAC register 301-64 to bus 600. At such time as SIU 100 can transmit these signals from high speed multiplexer 300 to MMC0, the SIU uses the steering information in the ZAC command to apply those signals to main memory control MMC0. On subsequent clock pulses the contents of registers Data 0 and Data 1 required to support the memory service are transmitted through SIU 100 to MMC0. Signals from high speed multiplexer 300 are transmitted by SIU 100 to the main memory control MMC0 to identify the source of the ZAC command as being data mover 900. Main memory contrl MMC0 will use this information when it sends data words back after it has obtained them from memory 800.

At such time as the memory 800 is available for a memory service, memory 800 will, in response to a read command, obtain in the usual manner the data stored at the specified address and will store the data read out of that address or addresses into its data out registers and on sequential clock pulses will apply the data word stored in its registers to MMC0. MMC0 will forward these words via SIU 100 to high speed multiplexer 300. HSMX 300 will store these two words in sequence, first into its H register 301-40 and on the next clock signal moving the first data word into register W register 0, 302-20 and on the next clock moving the second data word into W register 1 302-20. Control block 301-4 notifies data mover 900 that data words are stored in registers W register 0, W register 1, 302-20 and enables the necessary switches to transmit these twp data words into registers Data 0, DATA 1 900-10 and 900-12 of data mover 900.

The logic of the control block 900-20 is such that data mover 900 will not issue a write command unless at least one data word is stored in either register 900-10 or 900-12, or both, and data mover 900 is not in the process of issuing a read command. Thus, unless a data word is stored in the data 0 or data 1 register 900-10, 900-12 of data mover 900 in response to a previous ZAC read command, data mover 900 will issue a second ZAC read command to the next in order address as stored in registers 900-24a, 24b. After each direct ZAC read command is issued, the address stored in address counter 900-24b will be incremented by one and the tally stored in tally counter 900-26 will be decremented by one. To determine if an error was made in delivering the next address, the address and tally are added together by adder 900-28 and the 24 bit address and the 24 bit upper bound from register 900-14 are compared by comparator 900-30. As long as they are the same, or they compare, there is no comparison error, and data mover 900 will continue to operate or execute the memory to memory move instruction. In the event of a compare error, flip-flop 900-48 will be set, and when set will cause a fault fignal to be transmitted by control block 900-20 to HSMX 300 to stop the operation of data mover 900.

After the first ZAC command is issued by data mover 900, a second ZAC command will be issued in substantially the same way as the first. It will be routed to memory 800 so that two data words generally will be fetched from main memory 800 and retransmitted back to data mover 900. As soon as the second read command is received by HSMX 300, data mover 900 will store in registers 900-10, 900-12 the data words stored in registers 302-4 of HSMX 300, and data mover 900 will then issue an indirect write command. The necessary control signals are applied to control block 301-4 of high speed multiplexer 302 to identify the next word as being an indirect ZAC write command. Notwithstanding that the write command is to be indirect, i.e. HSMX 300 will supply actual write command to be sent to memory 800. A ZAC write command is placed on output data bus 900-46 by data mover 900. However, control block 301-4 causes an indirect ZAC command to be produced using the address obtained from the DA register of register bank 301-46. The data words stored in registers data 0 and data 1, registers 900-10, 900-12 are on the next two clocks, stored in the data 0, data 1 registers of register bank 301-64. High speed multiplexer 300 will request SIU 100 to connect it to main memory controller MMC0 and will apply the indirect ZAC command to the SIU which will transmit it to memory controller MMC0. On the next two clock pulses data words in registers data 0 and data 1 of register bank 301-64 will be applied to MMC0 through SIU for storage in main memory 800-16, for example.

During the time required for two data words to be received by data mover 900 from memory 800 in response to a direct read command, data mover 900 and HSMX can issue an indirect write command and transmit up to two data words to main memory 800 thus causing dual outstanding memory commands. A major benefit of dual commands is that a substantial amount of time is saved compared with having data mover 900 issuing a read command and waiting until the data words read from memory 800 are received by data mover 900 and stored in registers 900-10, 900-12 before issuing a write command. This degree of simultaneity significantly increases the effective data transfer rate.

Tally counter 900-26 has written into it the number of words that are to be transferred while executing a given memory to memory move. When tally counter 900-26 counts down to zero, data mover 900 stops. At such time as data mover 900 has completed the execution of a memory to memory move instruction, the tally in register 900-26 reaches zero, or has run out, control block 900-20 will issue a request for a data control word which will be forwarded by HSMX 300 to IOPP 200. IOPP 200 can, if another memory to memory move is needed, provide the DCW for data mover 900 and a LPW for HSMX 300 which permits data mover 900 to execute another memory to memory move from disc cache buffer 800-14 to user portion 800-16 of main memory 800.

Data mover 900 issues both read and write commands to memory 800 and each of these commands required a given number of clock pulses, or time periods, to complete. However, data mover 900 is designed to minimize the number of clock periods spent waiting for a memory command to be executed. The initial memory command issued by data mover 900 when executing a memory to memory move is read from memory. When this command is issued and if at least one data word is not stored in either register 900-10, 900-12 of data mover 900 will issue another memory read command followed immediately by a write command if at least one data word was obtained in response to the first read command and that word is stored in one of registers 900-10, 900-12. After a memory to memory move has been successfully started as stated above, the sequence of a read command followed by a write command continues with the write command being issued within the time period necessary to complete the previously issued read command.

The throughput or rate at which data words can be moved from the disc cache buffer 810-10, barring any interference with its access to memory 800 by other subsystems of the data processing system is determined by the time required to perform a memory read command plus the turn-around time within high speed multiplexer 300 and data mover 900 between the completion of one read command and the initiation of the next.

As a result of the manner of implementing of this invention, data mover 900 requires six clock pulses for such a turn-around. The equation for calculating maximum throughput is:

$$\frac{2}{[6 + (\text{No. Clks for Mem Rd})] \times T \text{ in us}} = M$$

(Thruput in millions of data words if T = 0.1 microsecond and a memory read command requires ten clocks to complete, the maximum throughput is 1.25 million data words per second. Should memory 800 require less time to transmit data from the addressed location in memory, the number of clocks required to execute a read command, there is an upper limit to the throughput. This upper limit is reached when a memory command can be executed by memory 800 in three clock periods. The maximum throughput under this circumstance would be 2.22 million words per second.

There are situations where the rate of transfer of data words by data mover 900 may be greater than desired, particularly if such a rate interferes with the operation of other subsystems such as CPU 700. To alleviate such a situation, programmable throttle sequencer counter 900-36 has been incorporated into data mover 900. Service sequence counter 900-36 causes data mover 900 to wait four clock periods before issuing a service request to high speed multiplexer 300 which determines the maximum throughput of data mover 900. Throttle 900-36 is implemented so that an additional four, eight, or twelve clock pulses, or clock periods, can be required between the completion of execution of a memory read command and the issuance of the next read command. Throttle 900-36 allows maximum throughputs of 1.25, 0.833, or 0.625 million words per second respectively in a preferred embodiment assuming a clock of one tenth of a microsecond. The setting for throttle 900-36 is contained in the DCW-L stored in register 900-14.

From the foregoing it is believed apparent that Applicant has provided hardware which permits blocks of several thousand data words to be moved from a restricted portion of memory, the disc cache buffer, to the user portion rapidly and efficiently with a minimum of interference with the overall operation of the data processing system. The data mover also eliminates at the same time the need to modify the operating system of the data processing system to take advantage of the benefits of a high speed buffer between disc storage devices and the user portions of main memory. The result is a significant increase in the throughput of a data processing system incorporating the invention, particularly where there is a repetitive need to access data that is stored in the disc cache buffer.

What is claimed is:

1. A data mover comprising:
    a data in bus;
    a data out bus;
    a control bus;
    data register means connected to the data in bus for storing at least one data word;
    control register means connected to the data in bus for storing at least one control word;
    means connected to the data out bus for issuing memory read commands and memory write commands; and
    control means connected to the control bus, to the data register means, and to the means for issuing memory commands for causing the means for issuing memory commands to issue a write command after issuing a read command on the data out bus only if a data word is stored in said data register means in response to a previously issued read command and to issue the data words stored in the data register means on the data out bus immediately following the issuing of write command.

2. The data mover of claim 1 which also comprises throttle means connected to the control means for limiting the maximum rate at which the data mover can transmit and receive data words.

3. A data mover comprising:

data register means for storing a data word, control register means for storing a control word, a data out bus, means for transmitting to the data out bus a memory read command derived from information stored in said control register means, means for transmitting to the data out bus a memory write command derived from information stored in said control register means and the data word stored in said data register means only if a data word is stored in said data register means in response to a previously transmitted read command.

4. A data mover comprising:
a data in bus;
a data out bus;
a control bus;
data register means connected to the data in bus having the capability of storing two data words;
control register means connected to the data in bus for storing at least one data control word;
means for issuing memory read commands and memory write commands connected to the data out bus; and
control means connected to the data in bus, the control bus, the data register means, control register means, and the means for issuing memory commands; said control means causing the means for issuing memory commands to issue on the data out bus a write command after issuing a read command on the data out bus only if a data word is stored in the data register means in response to a previously issued read command and to issue on the data out bus the data word stored in the data register means immediately following the issuing of a write command.

5. The data mover of claim 4 which also comprises a source of clock pulses, a sequence counter connected to the control means, the control register means and to the source of clock pulses for enabling the data mover to issue memory commands only after a predetermined number of clock pulses has been counted by the counter after the issuance of a preceding command.

6. The data mover of claim 5 in which the predetermined number of clock pulses is specified in the data control word stored in the control register means.

7. In a data processing system having a memory for storing a plurality of data words, said memory having a buffer portion and a user portion; a memory controller; a systems interface unit; the memory controller connecting the memory to the systems interface unit; a high speed multiplexer connected to the systems interface unit and having a plurality of ports, said multiplexer having the capability of issuing indirect memory commands; and an input/output processor connected to the systems interface unit; the improvements comprising: a data mover connected to a port of the high speed multiplexer for moving blocks of data words from the buffer portion of the memory to the user portion, said data mover having a data in bus, a data out bus, and a control bus connected to said port of the high speed multiplexer; data register means connected to the data in bus for storing a data word; control register means connected to the data in bus for storing a data control word; means for producing an address in memory connected to the data in bus; switch means connected to the means for producing an address and the data out bus for applying to the data out bus of the data mover read and write memory commands including addresses produced by said means for producing an address; a control block connected to the control bus, the data and control register means, the means for producing an address, and the switch means; said control block producing control signals; said switch means, in response to control signals from the control block producing a first read command addressed to the buffer portion of memory, and if no data word is stored in the data register after the first read command is issued, for issuing a second read command to the next memory location in the buffer portion, said switch means in response to signals from the control block applying a write command to the data out bus and the data word stored in the data register means to the data out bus, and repetitively issuing read and write commands and data words stored in the data register means until a block of data words is moved from the buffer area of memory to the user area.

8. In the data processing system of claim 7 in which the high speed multiplexer issues an indirect memory command for one type of memory command issued by the data mover.

9. In the data processing system of claim 8 in which the high speed multiplexer issues indirect write commands the address portion of which is in the user portion of the memory.

10. In a data processing system including multiplexer means for controlling a plurality of peripheral devices coupled to the multiplexer, memory means for storing data words said memory means having a user portion and a buffer portion, input/output processor means for generating instruction data words, and means for interconnecting the memory means, the processor means and the multiplexer means; said multiplexer means including register means, said register means storing data words transferred to said mutliplexer means and for preparing and issuing memory commands; and control means for controlling the operation of the multiplexer means; the improvements comprising:
a data mover, said data mover having data register means for storing a data word transferred to the data mover from the multiplexer means; control register means for storing at least one control word transferred to the data mover from the multiplexer means; means for issuing memory read and write commands to the mutliplexer means; means for issuing data words stored in the data register means to the multiplexer means; and data mover control means connected to the multiplexer for causing the means for issuing memory commands of the data mover to issue read and write types of memory commands, said means for issuing memory commands of the data mover issuing a read command followed by a write command if a data word is stored in the data register means in response to a previously issued read command, and to issue the data word stored in the data register means to the multiplexer means immediately following the issuing of a write command; said multiplexer means issuing a memory command which the multiplexer substitutes for one type of memory command issued by the data mover.

11. In the data processing system of claim 10 in which the type of memory command issued by the data mover which the multiplexer substitutes memory commands produced by the multiplexer means are write commands.

12. In the data processing system of claim 11 in which the write commands issued by the multiplexer means are addressed to the user portion of the memory means and the read commands to the buffer portion.

13. In the data processing system of claim 10 in which the data mover includes throttle means connected to the data mover control means for limiting the maximum rate at which the data mover can issue memory commands to the multiplexer means.

14. In the data processing system of claim 13 in which the throttle means includes a sequence counter which under program control requires "n", where "n" is an integer, clock periods to elapse between the issuance of memory commands.

15. In the data processing system of claim 14 in which "n" is the range of from 4 to 12.

16. A data processing system comprising: a systems interface unit (SIU) having a plurality of ports, said SIU having the capability in response to control signals applied to it of transmitting data words from one port to another; a memory controller connected to a memory port of the SIU; a random access memory connected to the memory controller and adapted to store data words in the memory and to retrieve data words previously stored in the memory; said memory having a buffer portion and a user portion; said memory controller causing said memory, in response to write commands transmitted to the memory, to store data words in a given memory location and in response to read commands to read data words out of memory which were stored at a given location in memory; a high speed multiplexer (HSMX) connected to a port of the SIU, said HSMX having a plurality of channels, said channels adapted to have mass storage devices connected thereto; said HSMX having control register means; means for producing read or write memory commands using information stored in the control register means; register means for storing data words transmitted to the multiplexer by a device connected to a channel; and means for transmitting data words stored in said register means to the SIU; an IOPP connected to one of the ports of the SIU and having the capability under program control of issuing commands to the high speed multiplexer and devices connected to a channel of the multiplexer; and a data mover having a data in bus, a data out bus, and a control bus, said buses being connected to the high speed multiplexer; said data mover having data registers connected to the data in bus for storing data words transmitted to the data mover from the high speed multiplexer; control register means connected to the data in bus for storing commands transmitted to the data mover from the IOPP; memory command preparing means connected to the data out bus for issuing memory read and memory write commands; and control means connected to the control bus, to the data register means, and to the memory command preparing means for causing the memory command preparing means to prepare and issue a memory read command to the memory in response to command words transmitted to the data mover from the IOPP, said memory read command including the address in memory of a particular location in the buffer portion of memory, issuing a second read command to the buffer portion of memory if no data words are stored in the data registers; and for issuing a write command to the user portion of memory and at least one data word stored in the data registers of the data mover before data words read out of memory pursuant to a previously issued read command have been received by the data mover and stored in the data register means thereof.

17. In the data processing system of claim 16 in which the HSMX issues one type of memory command addressed to one portion of the random access memory and forwards memory commands of the other type issued by the data mover addressed to the other portion of the random access memory.

18. In the data processing system of claim 17 in which the HSMX issues write memory commands addressed to the user portion of memory to the SIU and forwards read memory commands issued by the data mover to the SIU.

* * * * *